US011276201B1

(12) United States Patent
Garcia Sopo et al.

(10) Patent No.: US 11,276,201 B1
(45) Date of Patent: Mar. 15, 2022

(54) LOCALIZING AN AUGMENTED REALITY DEVICE

(71) Applicant: Snap Inc., Santa Monica, CA (US)

(72) Inventors: Maria Jose Garcia Sopo, London (GB); Qi Pan, London (GB); Edward James Rosten, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/929,976

(22) Filed: Jun. 1, 2020

(51) Int. Cl.
*G06T 7/73* (2017.01)
*G06T 19/00* (2011.01)

(52) U.S. Cl.
CPC .............. *G06T 7/75* (2017.01); *G06T 19/006* (2013.01); *G06T 2207/30244* (2013.01)

(58) Field of Classification Search
CPC ............... G06T 7/70–85; G06T 19/006; G06T 2207/30244
See application file for complete search history.

(56) References Cited

U.S. PATENT DOCUMENTS

| 9,652,896 | B1 | 5/2017 | Jurgenson et al. |
| 9,984,499 | B1 | 5/2018 | Jurgenson et al. |
| 2010/0257252 | A1* | 10/2010 | Dougherty ......... G06K 9/00671 709/217 |
| 2014/0232637 | A1 | 8/2014 | Park et al. |
| 2015/0172626 | A1* | 6/2015 | Martini .................... G06K 9/46 348/50 |
| 2015/0310665 | A1 | 10/2015 | Michail et al. |
| 2016/0253819 | A1 | 9/2016 | Mendez Mendez et al. |
| 2017/0109930 | A1 | 4/2017 | Holzer et al. |
| 2018/0061072 | A1 | 3/2018 | Benezra et al. |
| 2018/0061139 | A1 | 3/2018 | Rodriguez et al. |
| 2018/0137651 | A1* | 5/2018 | Levinshtein ............... G06T 7/75 |
| 2020/0080849 | A1* | 3/2020 | Ondruska ............... G01S 19/47 |
| 2020/0082635 | A1 | 3/2020 | Zhu et al. |

(Continued)

FOREIGN PATENT DOCUMENTS

WO     2018159168     9/2018

OTHER PUBLICATIONS

Fox D, Burgard W, Dellaert F, Thrun S. Monte carlo localization: Efficient position estimation for mobile robots. AAAI/IAAI. Jul. 18, 1999;19 (Year: 1999).*

(Continued)

*Primary Examiner* — Diane M Wills
(74) *Attorney, Agent, or Firm* — Schwegman Lundberg & Woessner, P.A.

(57) ABSTRACT

Determining the position and orientation (or "pose") of an augmented reality device includes capturing an image of a scene having a number of features and extracting descriptors of features of the scene represented in the image. The descriptors are matched to landmarks in a 3D model of the scene to generate sets of matches between the descriptors and the landmarks. Estimated poses are determined from at least some of the sets of matches between the descriptors and the landmarks. Estimated poses having deviations from an observed location measurement that are greater than a threshold value may be eliminated. Features used in the determination of estimated poses may also be weighted by the inverse of the distance between the feature and the device, so that closer features are accorded more weight.

12 Claims, 11 Drawing Sheets

(56) References Cited

U.S. PATENT DOCUMENTS

| | | |
|---|---|---|
| 2020/0134911 A1 | 4/2020 | Van Hoff et al. |
| 2020/0159242 A1 | 5/2020 | Liu et al. |
| 2021/0049784 A1* | 2/2021 | Torok .................. G01C 11/025 |
| 2021/0089572 A1* | 3/2021 | Lawlor .................. G06N 20/00 |

OTHER PUBLICATIONS

Fukuda et al., "Improvement of registration accuracy of a handheld augmented reality system for urban landscape simulation", Graduate School of Engineering, Osaka University, Suita, Osaka 565-0871, Japan Nikken Space Design Ltd., Bunkyo-ku, Tokyo, Japan, 2014 (Year: 2014).*

Lobo, Jorge, and Jorge Dias. "Vision and inertial sensor cooperation using gravity as a vertical reference." IEEE Transactions on Pattern Analysis and Machine Intelligence 25.12 (2003): 1597-1608 (Year: 2003).*

Xiao, Zhongyang, et al. "Monocular Vehicle Self-localization method based on Compact Semantic Map." 2018 21st International Conference on Intelligent Transportation Systems (ITSC). IEEE, 2018 (Year: 2018).*

"U.S. Appl. No. 17/083,722, Non Final Office Action dated Aug. 6, 2021", 20 pgs.

"International Application Serial No. PCT/US2021/034517, International Search Report dated Sep. 7, 2021", 3 pgs.

"International Application Serial No. PCT/US2021/034517, Written Opinion dated Sep. 7, 2021", 4 pgs.

Ma, Shujun, et al., "Robust Stereo Visual-Inertial Odometry Using Nonlinear Optimization", Sensors, 19(17), 3747, (Aug. 29, 2019), 15 pgs.

\* cited by examiner

LOCALIZING AN AUGMENTED REALITY DEVICE

BACKGROUND

Augmented reality (AR) refers to systems, methods, devices, and instructions that can capture image frames, enhance those image frames with additional information, and then present the enhanced information on a display. This may, for example, enable a user to hold up a mobile computing device (e.g., smart phone or tablet) to capture a video stream of a scene, and an output display of the mobile computing device may present the scene as visible to the user along with additional information. This additional information may include placing virtual objects in the scene so that the virtual objects are presented as if they exist in the scene. Such virtual objects are also processed to maintain their relationship with real objects as both real and virtual objects move over time, and as the perspective of the image sensor capturing the environment changes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
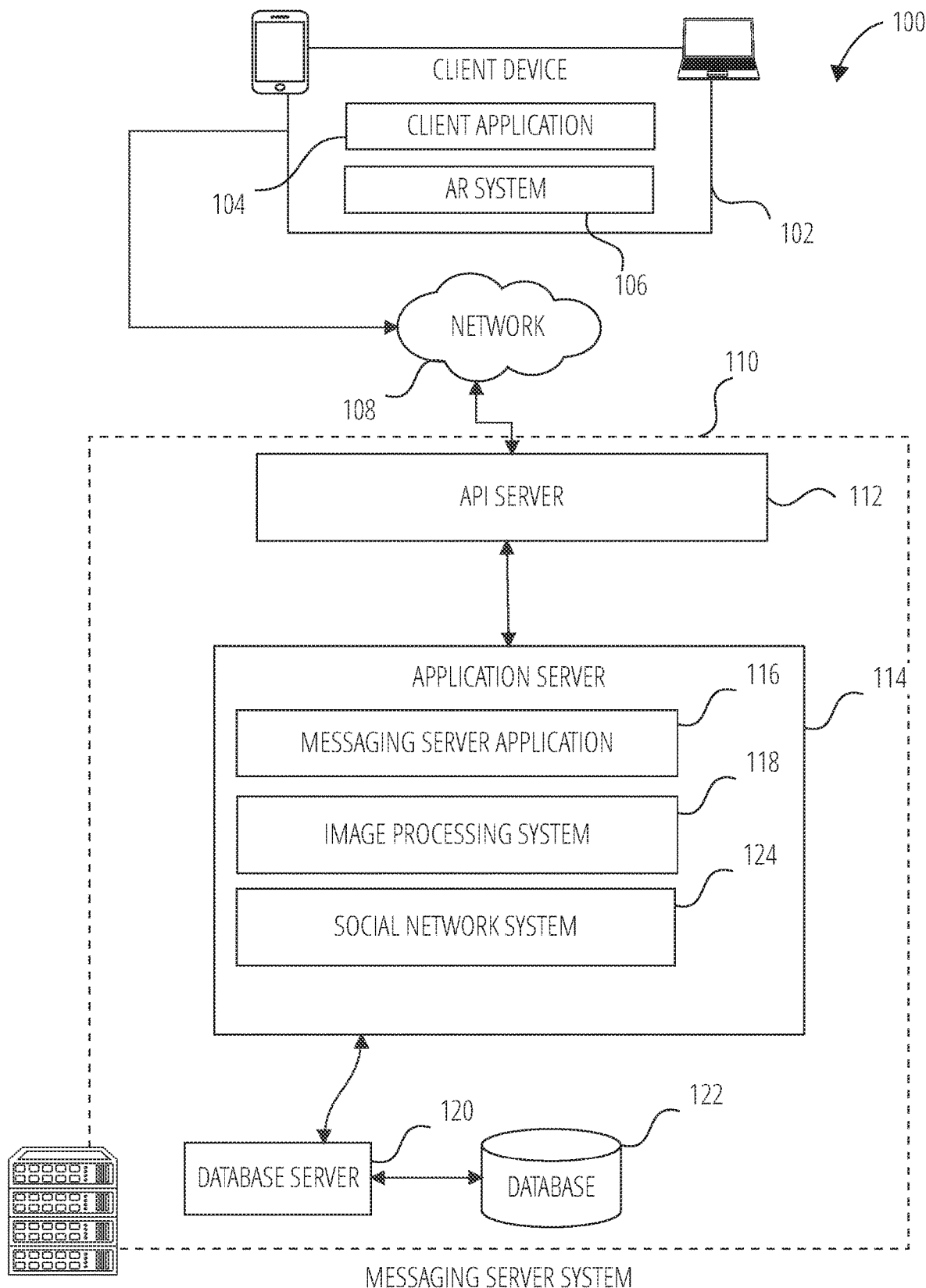
FIG. 1 is a diagrammatic representation of a networked environment in which the present disclosure may be deployed, in accordance with one example.

There are a number of requirements needed to permit the correct placement of a virtual object into a video stream or image of a real scene. One requirement is the existence of a 3D model that has features that correspond with features in the real world. The generation of a 3D model is referred to as "mapping" and typically involves locating recognizable features in the real world and recording them in the 3D model. While the features recorded in the 3D model are typically referred to as "landmarks," they may be little more than points or edges corresponding to corners or edges of structures or items in the real world. Mapping may be done by processing a number of different images of a scene to extract landmarks and place them in the 3D model. One technique for such mapping is known as SfM (Structure from Motion). The concepts describe herein are applicable, regardless of whether the 3D model is generated on the fly or is a preexisting 3D model.

Localization is the determination of the initial position and orientation (aka the "pose") of the device being used to capture the scene. Localization involves determining the orientation (rotation) of the device along three axes (pitch, yaw and roll) and the position of the device along three axes, for a total of six degrees of freedom. The goal of localization is to align the device's viewpoint in the real world to its virtual viewpoint in a 3D model given no prior pose information. The concepts described herein relate primarily but not exclusively to localization.

Once the device's pose has been determined, a virtual viewpoint in the 3D model can be generated that corresponds to the device's actual viewpoint, which then permits the positioning and projection of virtual objects into the image of the scene that is generated by the device.

If the device moves in any way, "tracking" refers to attempts to align the device's updated viewpoint (i.e. update the device's pose) in the 3D model, given a prior estimate of the pose.

Improving the initial pose used to localize the device, and improving the tracking of a device post-localization, permits more accurate positioning of virtual objects (or other enhancing information) in images or in an image stream. Accordingly, the methods and systems described herein improve the functioning of a device or system that includes augmented reality functionality.

In one example, initial pose estimation for tracking may be done by firstly visually processing images to detect features in the images and to extract corresponding descriptors for each feature. A descriptor is a set of unique identifiers that can be used to somewhat reliably describe a particular image region. 3D model descriptors, from a 3D model corresponding to the environment in which the device is located, can likewise be obtained and the image and 3D descriptors are matched and processed to generate a set of candidate poses for the device. The quality of the set of candidate poses is improved by refining the set of poses using data obtained from inertial sensors and a GPS receiver located in the device. The weight accorded to each candidate pose may also be increased or decreased based on whether the image feature(s) used to generate the candidate pose is closer or further away respectively from the device. Finally, the best of the candidate poses is selected as the localization pose.

Some of the methods described herein use an iterative outlier detection method, such as RANSAC or PROSAC. "Inliers" are generally understood to be data whose distribution can be explained by some set of model parameters, and "outliers" are data that do not fit the model sufficiently well. A model is generated from an initial set of data that includes both "good" and "bad" data and data deviating from the model by more than a chosen threshold (i.e. the outliers) are eliminated. An updated model can now be generated from the data from which the original outliers have been eliminated, and so on. Alternatively, poor data (e.g. estimated poses that do not fit the inlier set or accurate matches) can be eliminated from a set of data if an error created by use of that data, compared to an observation, is greater than a certain threshold. The elimination of outliers from a set of data can be referred to as "filtering."

Accordingly, in certain example embodiments, a method of determining a pose of an augmented reality device, executed by one or more processors, includes capturing an image of a scene having a number of features and extracting descriptors of features of the scene represented in the image, matching the descriptors to landmarks in a 3D model of the scene to generate sets of matches between the descriptors and the landmarks, generating estimated poses of the augmented reality device from at least some of the sets of matches between the descriptors and the landmarks, and eliminating estimated poses having deviations from an observed location measurement that are greater than a threshold value.

The deviations may be horizontal and/or or vertical distances between the estimated poses and the observed location measurement, and the threshold value may be a horizontal and/or vertical accuracy respectively, of the observed location measurement. The deviations may also be angular differences between gravity vectors of the estimated poses and an observed gravity vector, and the threshold value may be a threshold angular value.

In some example embodiments, the method may comprise determining, for each pose that has not been eliminated, a projected location error corresponding to at least one image distance between a projected 3D landmark and a corresponding feature in the image, and the pose having a minimum projected location error may be selected as a final pose. Each projected location error may be weighted by a weighting factor that varies depending on an inverse of a distance between the device and a feature in the scene on which a pose is based, prior to selecting the pose having the minimum projected location error as the final pose.

In some example embodiments, an augmented reality system comprises one or more processors, location-sensing components, an image capture device, and one or more machine-readable mediums storing instructions that, when executed by the one or more processors, cause the system to perform certain operations. The operations may comprise capturing an image of a scene with the image capture device, the scene having a number of features, extracting descriptors of features of the scene represented in the image, matching the descriptors to landmarks in a 3D model of the scene to generate sets of matches between the descriptors and the landmarks, generating estimated poses of the system from at least some of the sets of matches between the descriptors and the landmarks, and eliminating estimated poses having deviations from an observed location measurement, determined by the location-sensing components, that are greater than a threshold value.

The deviations may be horizontal and/or or vertical distances between the estimated poses and the observed location measurement, and the threshold value may be a horizontal and/or vertical accuracy respectively, of the observed location measurement. The deviations may also be angular differences between gravity vectors of the estimated poses and an observed gravity vector, and the threshold value may be a threshold angular value.

In some example embodiments, the operations may comprise determining, for each pose that has not been eliminated, a projected location error corresponding to at least one image distance between a projected 3D landmark and a corresponding feature in the image, and the pose having a minimum projected location error may be selected as a final pose. Each projected location error may be weighted by a weighting factor that varies depending on an inverse of a distance between the device and a feature in the scene on which a pose is based, prior to selecting the pose having the minimum projected location error as the final pose.

In some example embodiments, also provided is non-transitory machine-readable medium including instructions which, when read by a machine, cause the machine to perform operations or methods for generating a pose for an augmented reality system as described above, including but not limited to capturing an image of a scene having a number of features, extracting descriptors of features of the scene represented in the image, matching the descriptors to landmarks in a 3D model of the scene to generate sets of matches between the descriptors and the landmarks, generating estimated poses of the machine from at least some of the sets of matches between the descriptors and the landmarks, and eliminating estimated poses having deviations from an observed location measurement that are greater than a threshold value.

FIG. 1 is a block diagram showing an example messaging system 100 for exchanging data (e.g., messages and associated content) over a network. The messaging system 100 includes multiple instances of a client device 102, each of which hosts a number of applications including a client application 104 and an AR system 106. While illustrated separately from the client application 104 in FIG. 1, the AR system 106 is implemented in one example as a subcomponent of client application 104, and the AR system 106 operates under the management of client application 104. Each client application 104 is communicatively coupled to other instances of the client application 104 and a messaging server system 110 via a network 108 (e.g., the Internet).

A client application 104 is able to communicate and exchange data with another client application 104 and with the messaging server system 110 via the network 108. The data exchanged between client application 104, and between a client application 104 and the messaging server system 110, includes functions (e.g., commands to invoke functions) as well as payload data (e.g., text, audio, video or other multimedia data). The messaging system 100 may be used to communicate information for virtual objects to be displayed on client devices 102, to receive image data used to create 3D models, and the resulting 3D point models or model data as they are subsequently used by the AR system 106.

The messaging server system 110 provides server-side functionality via the network 108 to a particular client application 104. While certain functions of the messaging system 100 are described herein as being performed by either a client application 104 or by the messaging server system 110, the location of certain functionality either within the client application 104, the AR system 106 or the messaging server system 110 is a design choice. For example, it may be technically preferable to initially deploy certain technology and functionality within the messaging server system 110, but to later migrate this technology and functionality to the client application 104 if/when a client device 102 has a sufficient processing capacity.

As illustrated in FIG. 1, the messaging system 100 or the client application 104 includes AR system 106 that provides functionality to generate augmented reality images. In the current example implementation, the localization methods described herein are executed by the AR system 106 in client device 102. However, the 3D model utilized by the AR system 106 is typically hosted in the messaging server system 110 at least a portion of the 3D model is downloaded to the client device 102 prior to executing the localization methods described herein.

In some embodiments, the AR system 106 can be implemented as a standalone system on client application 104 and is not necessarily included in the messaging system 100. In other embodiments, the client application 104 or client device 102 include a portion of the AR system 106 (e.g., a portion of the augmented reality system 160 may be included independently in the client device 102, in the AR system 106, or in the client application 104). In embodiments where the client device 102 includes only a portion of the AR system 106, the client device 102 can work alone or in conjunction with the portion of the AR system 106 included in a particular application server or otherwise included in the messaging system 100.

The messaging server system 110 supports various services and operations that are provided to the client application 104. Such operations include transmitting data to, receiving data from, and processing data generated by the client application 104. This data may include message content, 3D model data, geolocation information, media annotation and overlays, virtual object data, message content persistence conditions, social network information, and live event information, as examples. Data exchanges within the messaging system 100 are invoked and controlled through functions available via user interfaces (UIs) of the client application 104.

Turning now specifically to the messaging server system 110, an Application Program Interface (API) server 112 is coupled to, and provides a programmatic interface to, an application server 114. The application server 114 is communicatively coupled to a database server 120, which facilitates access to a database 122 in which is stored data associated with messages and other data processed by the application server 114.

The Application Program Interface (API) server 112 receives and transmits message data (e.g., commands and message payloads) between the client device 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from a particular client application 104 to another client application 104, the sending of media files (e.g., images or video) from a client application 104 to the messaging server application 116, and for possible access by another client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The application server 114 hosts a number of applications and subsystems, including a messaging server application 116, an image processing system 118 and a social network system 124. The messaging server application 116 implements a number of message processing technologies and functions, particularly related to the aggregation and other processing of content (e.g., textual and multimedia content) included in messages received from multiple instances of the client application 104. As will be described in further detail, the text and media content from multiple sources may be aggregated into collections of content (e.g., called stories or galleries). These collections are then made available, by the messaging server application 116, to the client application 104. Other Processor and memory intensive processing of data may also be performed server-side by the messaging server application 116, in view of the hardware requirements for such processing.

The application server 114 also includes an image processing system 118 that is responsible for hosting 3D model and virtual object data. The image processing system 118 may also be used to generate a 3D model based on images received from client devices. However, images acquired by the client device 102 during the operations described herein are not typically used to build or enhance a 3D model. The 3D model generation is normally, but not necessarily, a separate process that is not conducted during the user's current use of the client device 102.

The application server 114 is communicatively coupled to a database server 120, which facilitates access to a database 122 in which is stored data generated by or required by operation of the messaging system 100.

Figure 2:
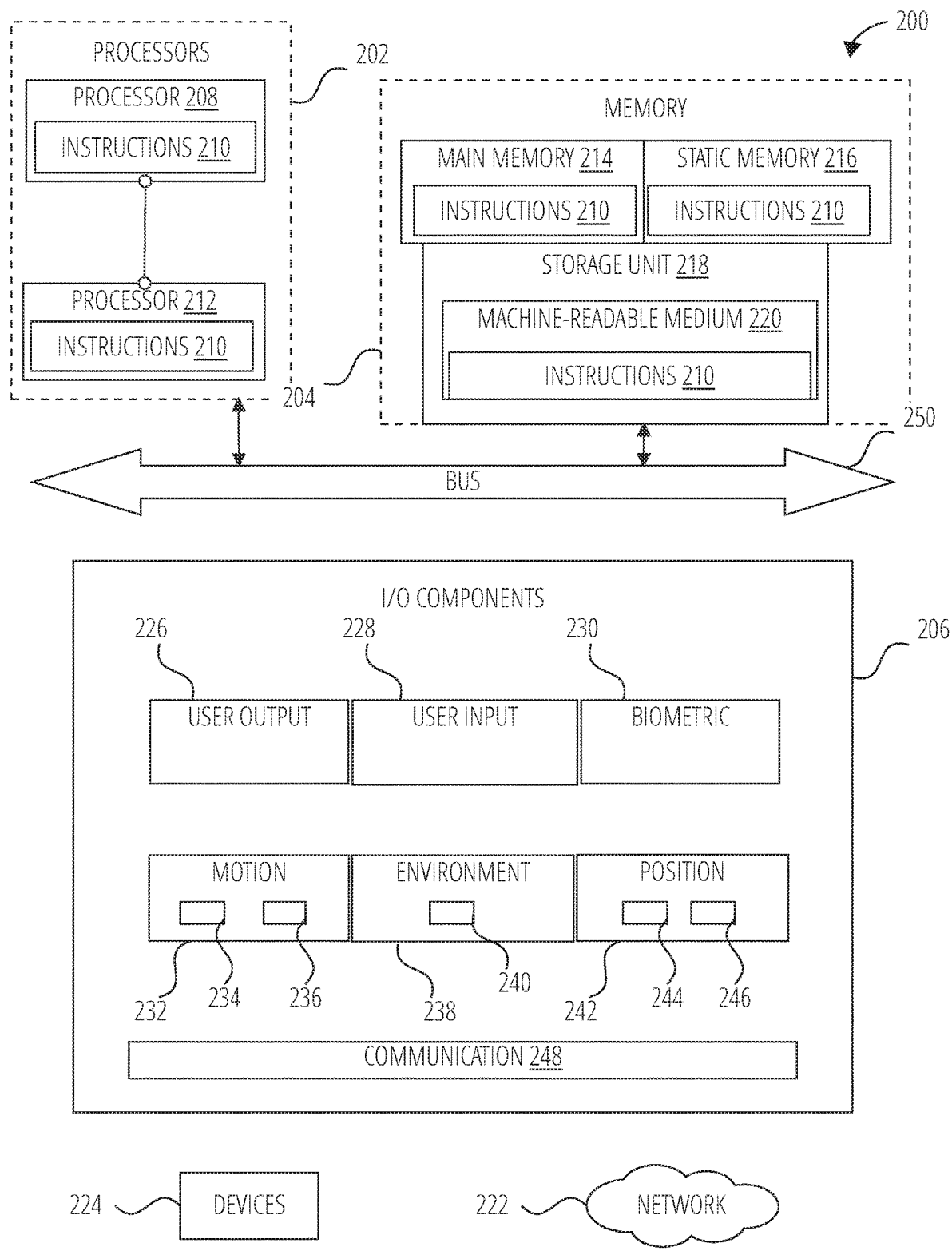
FIG. 2 is a diagrammatic representation of a machine in the form of a computer system within which a set of instructions may be executed for causing the machine to perform any one or more of the methodologies discussed herein, in accordance with one example.

FIG. 2 is a diagrammatic representation of the machine 200 within which instructions 210 (e.g., software, a program, an application, an applet, an app, or other executable code) for causing the machine 200 to perform any one or more of the methodologies discussed herein may be executed. For example, the instructions 210 may cause the machine 200 to execute any one or more of the methods described herein. The instructions 210 transform the general, non-programmed machine 200 into a particular machine 200 programmed to carry out the described and illustrated functions in the manner described. The machine 200 may operate as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 210, sequentially or otherwise, that specify actions to be taken by the machine 200. Further, while only a single machine 200 is illustrated, the term "machine" shall also be taken to include a collection of machines that individually or jointly execute the instructions 210 to perform any one or more of the methodologies discussed herein.

The machine 200 may include processors 202, memory 204, and I/O components 206, which may be configured to communicate with each other via a bus 250. In an example embodiment, the processors 202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 208 and a Processor 212 that execute the instructions 210. The term "Processor" is intended to include multi-core processors that may comprise two or more independent processors (sometimes referred to as "cores") that may execute instructions contemporaneously. Although FIG. 2 shows multiple processors 202, the machine 200 may include a single Processor with a single core, a single Processor with multiple cores (e.g., a multi-core Processor), multiple processors with a single core, multiple processors with multiples cores, or any combination thereof.

The memory 204 includes a main memory 214, a static memory 216, and a storage unit 218, both accessible to the processors 202 via the bus 250. The main memory 204, the static memory 216, and storage unit 218 store the instructions 210 embodying any one or more of the methodologies or functions described herein. The instructions 210 may also reside, completely or partially, within the main memory 214, within the static memory 216, within machine-readable medium 220 within the storage unit 218, within at least one of the processors 202 (e.g., within the Processor's cache memory), or any suitable combination thereof, during execution thereof by the machine 200.

The I/O components 206 may include a wide variety of components to receive input, provide output, produce output, transmit information, exchange information, capture measurements, and so on. The specific I/O components 206 that are included in a particular machine will depend on the type of machine. For example, portable machines such as mobile phones may include a touch input device or other such input mechanisms, while a headless server machine will likely not include such a touch input device. It will be appreciated that the I/O components 206 may include many other components that are not shown in FIG. 2. In various example embodiments, the I/O components 206 may include user output components 226 and user input components 228. The user output components 226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 206 may include biometric components 230, motion components 232, environmental components 238, or position components 242, among a wide array of other components. For example, the biometric components 230 include components to detect expressions (e.g., hand expressions, facial expressions, vocal expressions, body gestures, or eye-tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 232 may include acceleration sensor components (e.g., accelerometers 234), rotation sensor components (e.g., gyroscopes 236) etc. The environmental components 238 include, for example, one or cameras 240 (with still image/photograph and video capabilities) or other image capture devices, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 242 may include location sensor components (e.g., GPS receiver 244), altitude sensor components (e.g., altimeters or barometers that detect air pressure from which altitude may be derived), orientation sensor components (e.g., magnetometer 246), and the like. The I/O components 206 may also include derived sensors such as a gravity sensor, which provides a gravity vector relative to the orientation of the client device 102. The gravity sensor is typically derived from the accelerometers 234, where other sensors (e.g. the magnetometer 246 and the gyroscopes 236) help to remove linear acceleration from the accelerometer data.

Communication may be implemented using a wide variety of technologies. The I/O components 206 further include communication components 248 operable to couple the machine 200 to a network 222 or devices 224 via respective coupling or connections. For example, the communication components 248 may include a network interface Component or another suitable device to interface with the network 222. In further examples, the communication components 248 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 224 may be another machine or any of a wide variety of peripheral devices (e.g., a peripheral device coupled via a USB).

Moreover, the communication components 248 may detect identifiers or include components operable to detect identifiers. For example, the communication components 248 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 248, such as location via Internet Protocol (IP) geolocation, location via Wi-Fi® signal triangulation, location via detecting an NFC beacon signal that may indicate a particular location, and so forth.

The various memories (e.g., main memory 214, static memory 216, and/or memory of the processors 202) and/or storage unit 218 may store one or more sets of instructions and data structures (e.g., software) embodying or used by any one or more of the methodologies or functions described herein. These instructions (e.g., the instructions 210), when executed by processors 202, cause various operations to implement the disclosed embodiments.

The instructions 210 may be transmitted or received over the network 222, using a transmission medium, via a network interface device (e.g., a network interface Component included in the communication components 248) and using any one of several well-known transfer protocols (e.g., hypertext transfer protocol (HTTP)). Similarly, the instructions 210 may be transmitted or received using a transmission medium via a coupling (e.g., a peer-to-peer coupling) to the devices 224.

Figure 3:
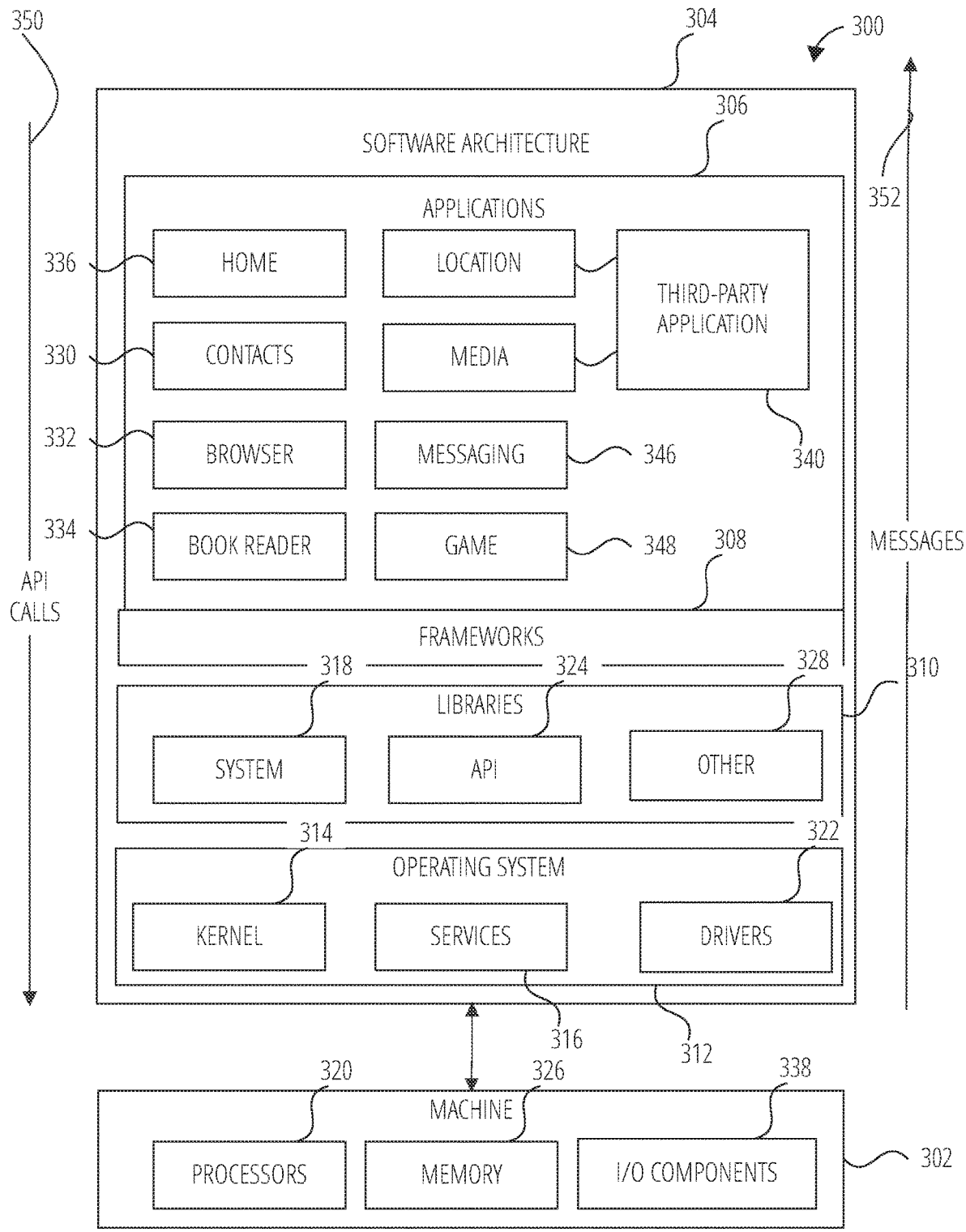
FIG. 3 is block diagram showing a software architecture within which the present disclosure may be implemented, according to one example.

FIG. 3 is a block diagram 300 illustrating a software architecture 304, which can be installed on any one or more of the devices described herein. The software architecture 304 is supported by hardware such as a machine 302 that includes processors 320, memory 326, and I/O components 338. In this example, the software architecture 304 can be conceptualized as a stack of layers, where each layer provides a particular functionality. The software architecture 304 includes layers such as an operating system 312, libraries 310, frameworks 308, and applications 306. Operationally, the applications 306 invoke API calls 350 through the software stack and receive messages 352 in response to the API calls 350.

The operating system 312 manages hardware resources and provides common services. The operating system 312 includes, for example, a kernel 314, services 316, and drivers 322. The kernel 314 acts as an abstraction layer between the hardware and the other software layers. For example, the kernel 314 provides memory management, Processor management (e.g., scheduling), Component management, networking, and security settings, among other functionality. The services 316 can provide other common services for the other software layers. The drivers 322 are responsible for controlling or interfacing with the underlying hardware. For instance, the drivers 322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 310 provide a low-level common infrastructure used by the applications 306. The libraries 310 can include system libraries 318 (e.g., C standard library) that provide functions such as memory allocation functions, string manipulation functions, mathematic functions, and the like. In addition, the libraries 310 can include API libraries 324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 310 can also include a wide variety of other libraries 328 to provide many other APIs to the applications 306.

The frameworks 308 provide a high-level common infrastructure that is used by the applications 306. For example, the frameworks 308 provide various graphical user interface (GUI) functions, high-level resource management, and high-level location services. The frameworks 308 can provide a broad spectrum of other APIs that can be used by the applications 306, some of which may be specific to a particular operating system or platform.

In an example embodiment, the applications 306 may include a home application 336, a contacts application 330, a browser application 332, a book reader application 334, a location application 342, a media application 344, a messaging application 346, a game application 348, and a broad assortment of other applications such as a third-party application 340. The applications 306 are programs that execute functions defined in the programs. Various programming languages can be employed to create one or more of the applications 306, structured in a variety of manners, such as object-oriented programming languages (e.g., Objective-C, Java, or C++) or procedural programming languages (e.g., C or assembly language). In a specific example, the third-party application 340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 340 can invoke the API calls 350 provided by the operating system 312 to facilitate functionality described herein.

Figure 4:
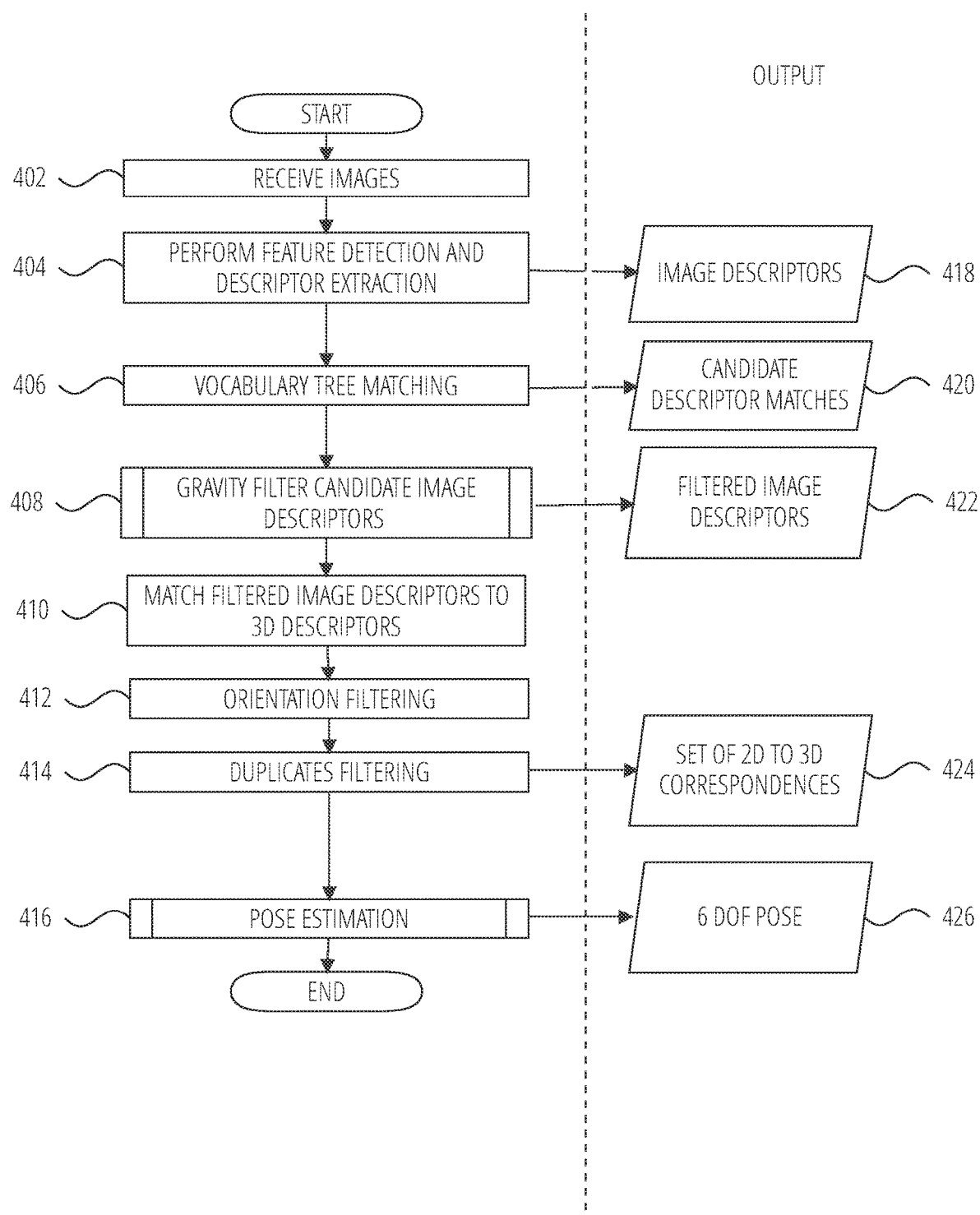
FIG. 4 is a flowchart illustrating a method of localization pose estimation according to one example.

FIG. 4 is a flowchart illustrating a localization method according to one example, typically executing in the AR system 106 of a client device 102. At this point, a full or reduced 3D model has been downloaded to the client device 102 from image processing system 118, based on the GPS position of the client device 102 as reported by the GPS receiver 244 and the time of day. The 3D model descriptors corresponding to the 3D model are, in one example, stored in leaf nodes of a vocabulary tree that is determined by hierarchical k-means clustering of the 3D model descriptors.

The method commences at block 402 with reception by the AR system 106 of images from a camera 240.

The AR system 106 then performs feature detection and descriptor extraction on one or more of the images at block 404. This is done using a known feature detection and extraction system such as ORB or BRISK. This results in the generation of a set of image descriptors 418 corresponding to detected features in an image. A descriptor is a set of unique data, generally binary, that can be used to somewhat reliably describe a particular image region.

At block 406 it is then determined, for each of the image descriptors 418, whether there is a match between an image descriptor and a 3D model descriptor using an approximate nearest neighbor scheme, such as a match in a leaf node of the vocabulary tree. If there is a match, the image descriptor is retained for further processing as one of a set of candidate descriptor matches 420.

The candidate descriptor matches 420 are then gravity filtered in subroutine block 408. Gravity filtering is discussed in more detail with respect to FIG. 5, resulting in a set of filtered image descriptors 422.

The image descriptors 418 are then matched to 3D descriptors at block 410, using a known feature matching system such as ORB. At this point, there may be a number of potential matches between each image descriptor and landmarks in the 3D model.

The matched image and 3D descriptors are then filtered for orientation at block 412. This is done by comparing the orientation of each image descriptor with the orientation of each 3D model descriptor that has been identified as a potential match with that image descriptor in block 410. All 3D model descriptors that do not have a similar orientation to an image descriptor are rejected as match for that image descriptor. This orientation filtering is described in more detail below with reference to FIG. 5.

The remaining set of matches between image descriptors and 3D model descriptors is then filtered to eliminate any duplicate matches at block 414. This duplicate filtering is described in more detail below with reference to FIG. 7.

The resulting set of 2D to 3D correspondences 424 is then used to estimate the pose of the client device 102 at subroutine block 416. The resulting output is a 6 DOF pose 426 that can be used by the AR system 106 to locate virtual objects in a representation of the images or video stream, for example displayed to the user of the client device 102 on a display screen or streamed over the network 108. Also, as mentioned above, the final localization pose estimate is also used as an initial pose in a tracking system implemented in AR system 106.

Figure 5:
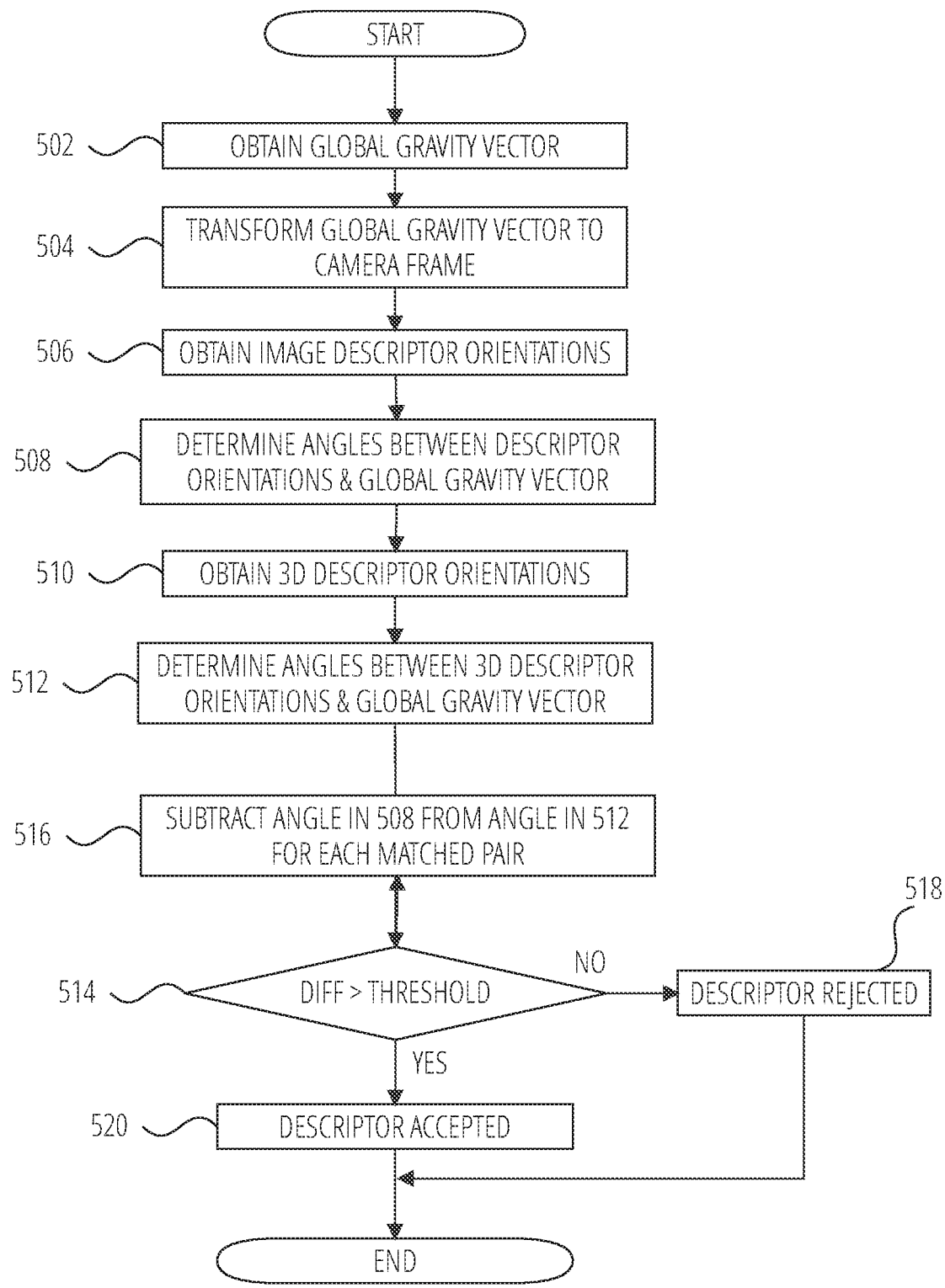
FIG. 5 is a flowchart illustrating the method of descriptor gravity filtering mentioned in subroutine block 408 of FIG. 4.

FIG. 5 shows an example method for performing the gravity filtering of the candidate descriptor matches 420 discussed above with reference to block 408 of FIG. 4, resulting in a set of filtered image descriptors 422.

The method commences at block 502 by obtaining the relevant global (i.e. actual) gravity vector relative to the orientation of the client device 102 using the motion components 232 and position components 242 of the client device as discussed above. The global gravity vector is then transformed at block 504 to the camera frame and the angle between the gravity vector and the y axis in the camera frame is determined.

In block 506 the orientation, in the camera frame, of each of the image descriptors is determined. The orientation of an image descriptor can be determined using known image processing techniques. For example, the orientation of an image feature can be determined by computing the intensity centroid of the area around the feature within a pixel radius, for example 30 pixels, and then assuming that the orientation of the feature is the vector between the center of the feature and the intensity center. Other known techniques may also be used to determine image descriptor orientation.

The angle between each descriptor's orientation and the global gravity vector (in the camera frame) is determined at block 508 to obtain a difference angle alpha.

In the same way, since the 3D model is gravity aligned, the orientation of each 3D descriptor (i.e. the projections of 3D landmarks into the camera frame) can be determined at block 510. The angle between the orientation for each 3D descriptor and the global gravity vector (in the camera frame) is determined at block 512 to obtain a difference angle beta.

For each match between an image descriptor and a 3D descriptor (as determined in block 406) the difference between angle alpha and angle beta is determined at block 516. The difference between these two angles is compared to a threshold angular value at decision block 514. The threshold is an estimate of the expected error in 2D feature orientation computation. Theoretically this threshold should be zero but changes in lighting, for example, can affect the detected 2D feature position and therefore, feature orientation will vary within the threshold. If the angle is greater than the threshold, the corresponding image descriptor is rejected at block 518 and if the angle is less than the threshold, the descriptor is accepted at block 520. Accepted descriptors are included in the set of filtered image descriptors 422.

Once the final candidate image descriptor has been accepted or rejected based on the comparison in block 514, the method ends and returns to block 410.

Figure 6:
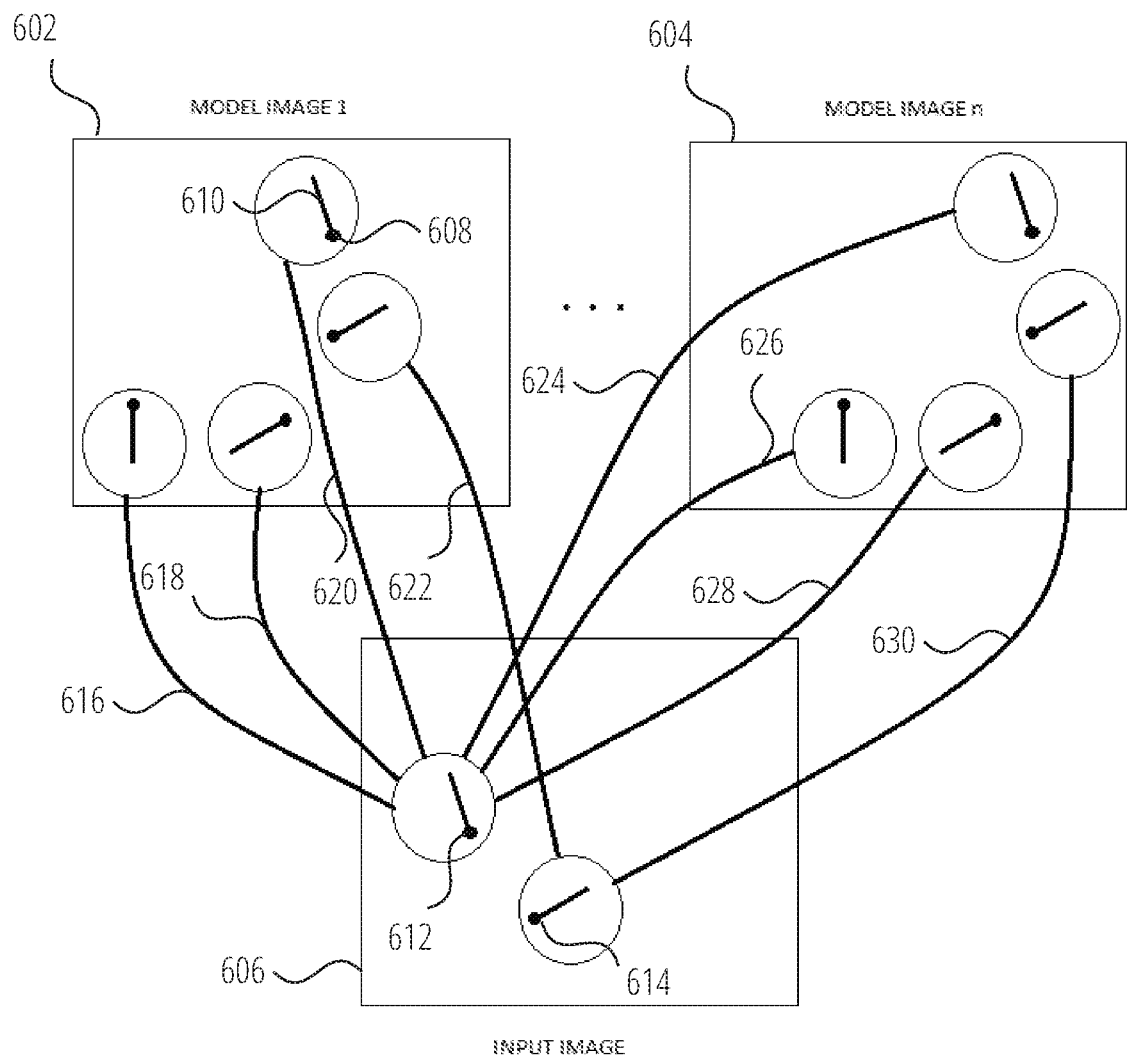
FIG. 6 illustrates the orientation filtering of matched image descriptors and 3D descriptors as mentioned in block 412 of FIG. 4.

FIG. 6 illustrates an example method for the orientation filtering of matched image descriptors and 3D descriptors. Shown in FIG. 6 are a model image 1602 and a model image n 604 and an input image 606. The model images 602 and 604 are two of a set of n model images generated by the feature matching system. Each model image from 1 to n represents a different virtual point of view of the 3D model (see FIG. 7). The input image 606 is received from the camera 240 of the client device 102.

Each feature in the model and input images (e.g. feature 608) has an associated orientation represented schematically by a line extending from the feature (e.g. line 610 for feature 608.) The matching of image descriptors 418 with 3D descriptors done at block 410 may result in more than one match in the model images 602 and 604 for each image descriptor. As can be seen, feature 612 in input image 606 has been matched with three 3D descriptors in each of model image 602 and model image 604 as illustrated by lines 616, 618, 620, 624, 626 and 628 while feature 614 in input image 606 has been matched with one 3D descriptor in each of model image 602 and model image 604 as illustrated by lines 522 and 524.

However, by comparing the orientations of the features matched, a number of identified matches can be eliminated. This can be done by subtracting the orientations of two potential matches and eliminating those having a magnitude outside a certain range (e.g. 0 to 10 degrees and 350 to 360 degrees) or by generating a histogram of these magnitudes and keeping only those matches in the bins of the histogram having the largest sizes. This is based on the assumption that if matches are correct the differences between all matched feature orientations should be similar. Bad matches are expected to have a random distribution and therefore when matches are classified in a histogram according to orientation differences, most good matches can easily be identified by only keeping the matches in the bins of the histogram with largest size per model image.

As can be seen from FIG. 6, the matches indicated by lines 616, 618, 626 and 628 will be eliminated in such a comparison, while the matches illustrated by lines 620, 622 and 624 and 614 will be retained.

Figure 7:
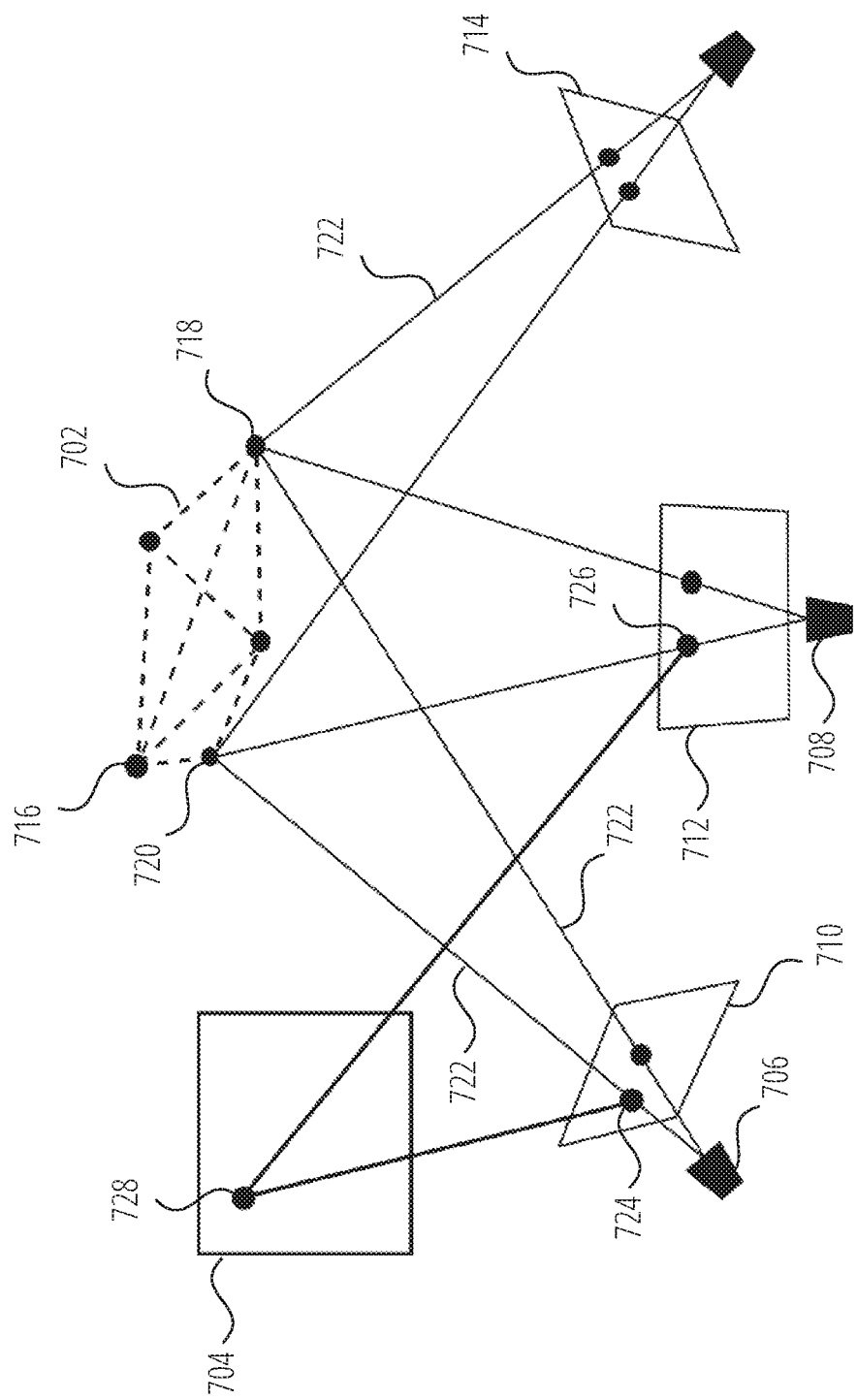
FIG. 7 illustrates the elimination of duplicate matches between image descriptors and 3D descriptors as mentioned in block 414 of FIG. 4.

FIG. 7 illustrates an example method for eliminating duplicate matches between image descriptors and 3D descriptors. Shown in FIG. 7 are a 3D model 702, an input image 704, model images 710, 712 and 714, and a number of virtual cameras, e.g. 706 and 708. Each of the model images represents a virtual point of view of the 3D model 702 from the position of a virtual camera.

The 3D model 702 includes a number of 3D landmarks, e.g. landmarks 718, 720 and 716, that can be seen in a model image along lines of sight 722. For example, landmark 720 appears in model image 710 as feature 724 and in model image 712 as feature 726. If feature 728 in input image 704 has been matched with feature 724 in model image 710 and with feature 726 in model image 712, then these are duplicate matches since they both refer to landmark 720. That is, once it has been determined that feature 728 corresponds to landmark 720 via a match between image feature 728 and model feature 724, additional matches determined in subsequent model images can be discarded.

This is done by using a known deduplication technique.

Figure 8:
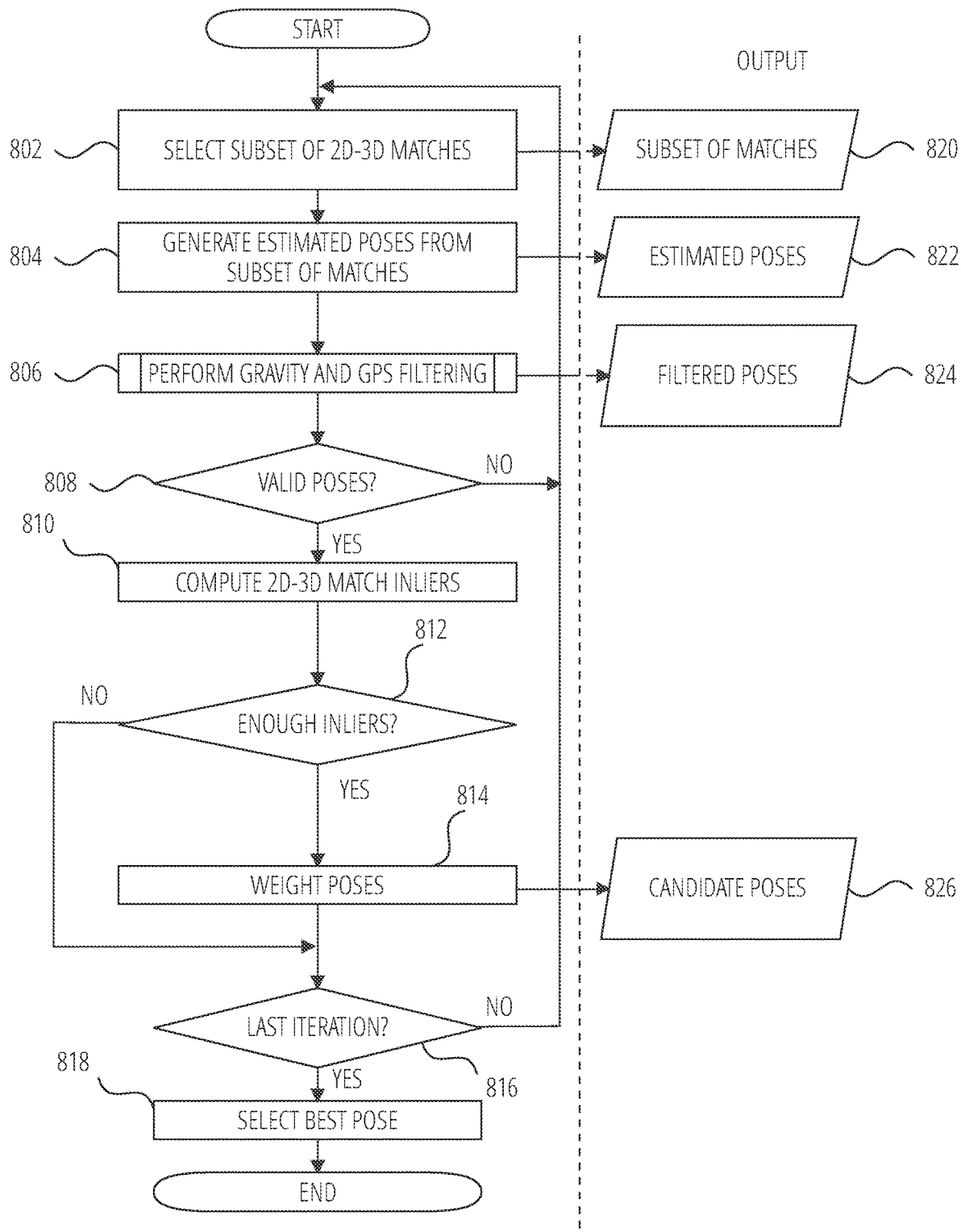
FIG. 8 is a flowchart illustrating the method of pose estimation mentioned in block 416 of FIG. 4

FIG. 8 shows an example method for performing pose estimation as discussed above with reference to block 416 of FIG. 4. The first step is to randomly select a subset of the set of 2D to 3D correspondences 424 at block 802 resulting in a subset of matches 820, containing outliers. The size of the subset is the smallest sufficient to determine the pose. In a situation where the characteristics of the camera are known, only three correspondences are needed.

Poses are then generated at block 804 from the subset of matches, to generate a set of estimated poses 822. The estimated poses 822 are then gravity and GPS filtered in subroutine block 806 as described in more detail with reference to FIG. 9 and FIG. 10, to generate a set of filtered poses 824. At decision block 808 it is checked whether or not there are any valid poses in the set of filtered poses 824 (i.e. the set of filtered poses 824 is not an empty set). If so, the filtered poses 824 are passed to block 810 to identify and select inlier poses. If there are no valid poses, the method returns to block 802 and a new subset of matches 820 is selected at block 802.

Inlier 2D to 3D matches are then determined for each pose at block 810. This is done by computing a projected location error, for example the reprojection error, for each 2D to 3D match from which a valid pose has been generated and then selecting as inliers those 2D to 3D matches whose reprojection error is equal to or lower than a threshold, for example three pixels, and rejecting those matches whose reprojection error is greater than the threshold. The reprojection error is a geometric error corresponding to the image distance between a projected feature in an image generated from a 3D landmark using a pose, and an observed feature in the image. This error quantifies how closely the projection of a 3D point corresponds to an actual point in the image. The reprojection error can either be calculated for each 2D to 3D match (which is the case for block 810) or it can be calculated for a pose overall using the reprojection errors of the 2D to 3D matches used to generate the pose.

In order to favor poses that are based on 3D landmarks that are closer, the reprojection error of each of the set of 2D to 3D matches is weighted using an extra weighting term prior to the determination in block 810 of whether or not a match is an inlier. The weighting factor may for example be determined as follows:

$$\text{weighting\_factor} = 1/\text{GPSaccuracy} * 1/\sqrt{(Px-\text{GPSN})^2, (Py-\text{GPSU})^2, (Pz-\text{GPSE})^2}$$

where GPSaccuracy is the accuracy of the GPS coordinates, as received from GPS receiver 244, Pn are the coordinates of the 3D landmark and GPSN, GPSU and GPSE are the coordinates of the location of the camera along the North, Up and East directions of the ENU coordinate system, respectively. That is, this example weighting factor is the product of the inverse of the GPS accuracy and the inverse of the distance of the 3D landmark from the camera.

After the inlier 2D to 3D matches are determined at block 810 for each of the valid poses received from block 808, it is determined at decision block 812 whether at least one pose has sufficient inlier matches compared to a fixed threshold (i.e. a number higher than the minimum number of points required to obtain a model estimate, for example 20.) If so, the corresponding pose(s) is/are passed to block 814. If not, the method passes to decision block 816.

At block 814, given a set of inlier matches and its 3D landmarks with their image projections in 2D, a corresponding pose is determined that minimizes the overall pose projected location error, e.g. The reprojection error or the square root of the sum of squared distances between the observed image projections in 2D and the projected 3D landmarks. The square root of the sum of squared differences is determined as follows:

$$D = \sqrt{((x-x^-)(x-x^-) + (y-y^-)(y-y^-))}$$

where (x, y) is the actual 2D feature position in the image and (x$^-$, y$^-$) is the estimated 2D position determined by projection of the corresponding 3D landmark into the image using the pose under consideration. Each value of D or the reprojection error, as the case may be, is multiplied by the "weighting_factor" term discussed above with reference to ensure that 3D landmarks closer to the camera has more influence than features that are far away when refining the pose The resulting poses with their associated weighted reprojection errors are then added to the set of candidate poses 826. If this is the last iteration (decision block 816), the method proceeds to block 818 for the selection of the best pose. If it is not the last iteration, the method returns to block 802 for selection of another subset of matches. The number of iterations chosen is a tradeoff between speed and accuracy. The more iterations the more accurate the resulting pose but the longer it will take to generate it.

At block 818, the best pose is selected. This is done by selecting either the pose with the minimum weighted reprojection error (generated in block 814) or the pose with the minimum distance between the real position of the feature in the camera frame and the projection of the 3D landmark into the camera frame, also weighted by the weighting factor as above. This distance is calculated as the square root of the sum of the squares of the differences between the x and y coordinates of the position of the feature and the projection of the 3D landmark in the camera frame.

Figure 9:
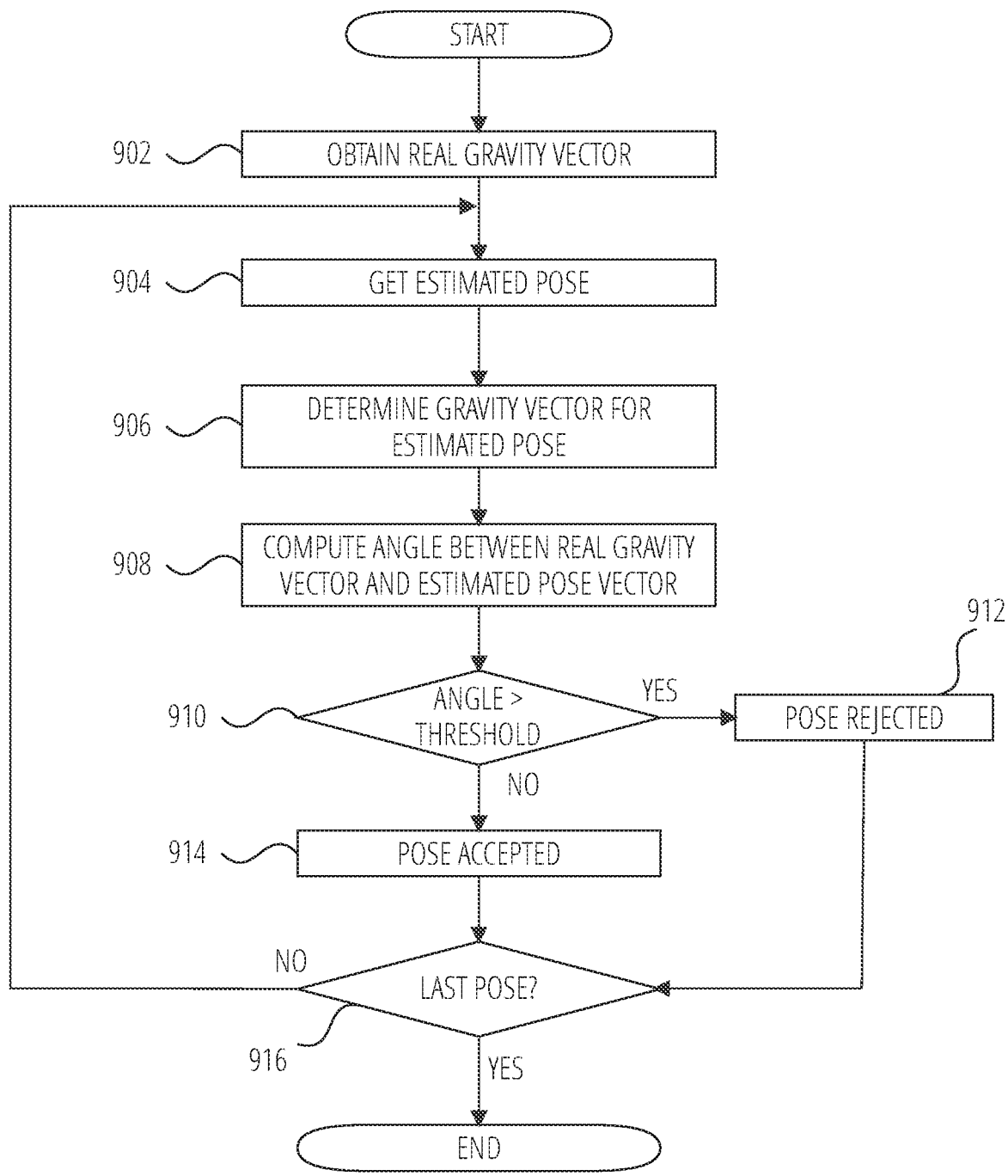
FIG. 9 is a flowchart illustrating the method of pose gravity filtering mentioned in subroutine block 806 of FIG. 8.

The gravity filtering performed in subroutine block 806 of FIG. 8 is shown in more detail in FIG. 9

The first step is to obtain the real-world gravity vector from a gravity sensor derived from the motion components 232 and position components 242, at block 902. One of the estimated poses 822 is obtained at block 904 and its gravity vector is determined at block 906. The angle (i.e. the difference) between the observed gravity vector and the pose gravity vector is computed at block 908. The angle between the observed gravity vector and the pose gravity vector is compared to a threshold angular value at decision block 910. If the difference is greater than the threshold, the pose is rejected at block 912. If the difference is less than the threshold, the pose is accepted at block 914. The method then continues at decision block 916, where it is checked whether or not the pose that has just been considered is the last pose. If so, the gravity filtering ends; if not, the method returns to block 904 and another of the estimated poses 822 is retrieved.

Figure 10:
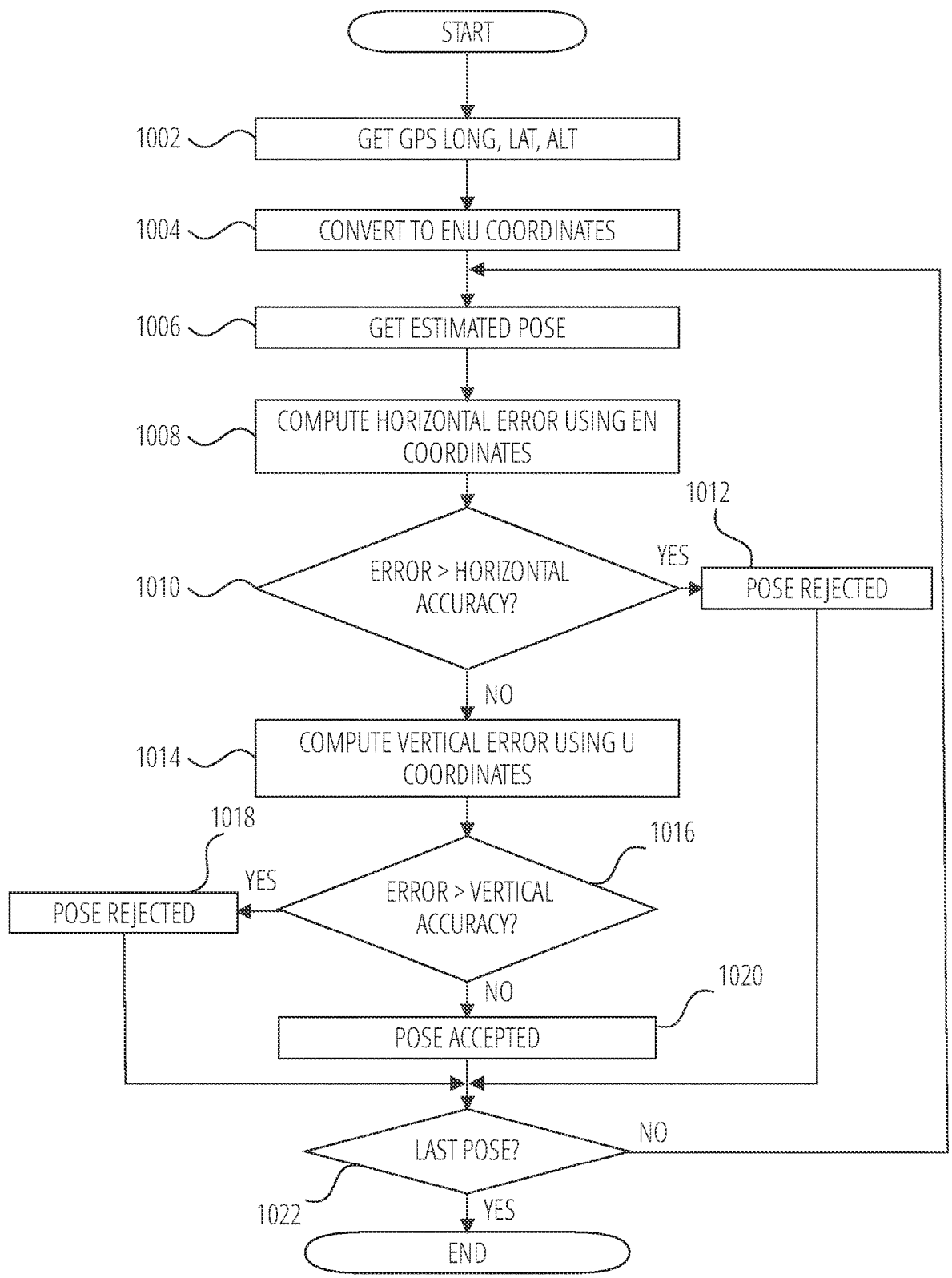
FIG. 10 is a flowchart illustrating the method of pose GPS filtering mentioned in subroutine block 806 of FIG. 8.

The GPS (i.e. location) filtering performed in subroutine block 806 of FIG. 8 is shown in more detail in FIG. 10. An observed location measurement, in this case the GPS coordinates, and estimated location measurement accuracy, in this case the GPS accuracy, are obtained from a location-determining device, in this case the GPS receiver 244 at block 1002. The GPS coordinates are typically in form of latitude, longitude and altitude (i.e. geodetic) but may be represented in another global coordinate system, e.g. the Universal Transverse Mercator system. Regardless, the GPS coordinates are first converted to local vertical and local horizontal coordinates at block 1004, which are the coordinates used by the AR system 106 in this example. This is done using known techniques. The local vertical and horizontal coordinates may for example be ENU (East, North, Up) coordinates.

For example, to convert from latitude, longitude and altitude to ENU, it is first necessary to convert the GPS values to x, y and z values in the ECEF (Earth-Centered, Earth-Fixed) geocentric coordinate system. The ECEF x, y and z values are then converted to ENU x, y, z values.

Once this is done, one of the estimated poses 822, whose location (x, y, z coordinates) is already in ENU format is obtained at block 1006. The horizontal distance between the location of the client device (as reflected by the data received and converted from the GPS receiver 244) and the estimated pose is determined at block 1008 as the square root of the sum of the squares of the differences between the GPS EN and the estimated pose's x and y coordinates respectively.

The resulting calculated error between the pose horizontal location and the GPS-determined horizontal location is compared to the horizontal accuracy of the GPS coordinates as reported by the GPS receiver 244 at block 1010. The calculated error is then checked at decision block 1010. If the calculated error is greater than the GPS accuracy, the pose is rejected at block 1012 and the method continues at block 1022. If the calculated error is less than the GPS accuracy, the pose is accepted at block 1012 and the method continues at block 1014.

At block 1014, the vertical distance between the estimated pose and the location of the client device 102 (as reflected by the data received and converted from the GPS receiver 244) is determined as the magnitude of the difference between the GPS U and pose z coordinates.

The resulting calculated error between the pose vertical location and the GPS-determined vertical location is compared at decision block 1016 to the vertical accuracy of the GPS coordinates as reported by the GPS receiver 244 at block 816. If the calculated error is greater than the GPS accuracy, the pose is rejected at block 1018 and the method continues at decision block 1022. If the calculated error is less than the GPS accuracy, the pose is accepted at block 1020.

The method then proceeds at decision block 1022 where it is checked whether or not the pose that has just been considered is the last pose. If so, the gravity filtering ends; if not, the method returns to block 904 and another of the estimated poses is retrieved.

Figure 11:
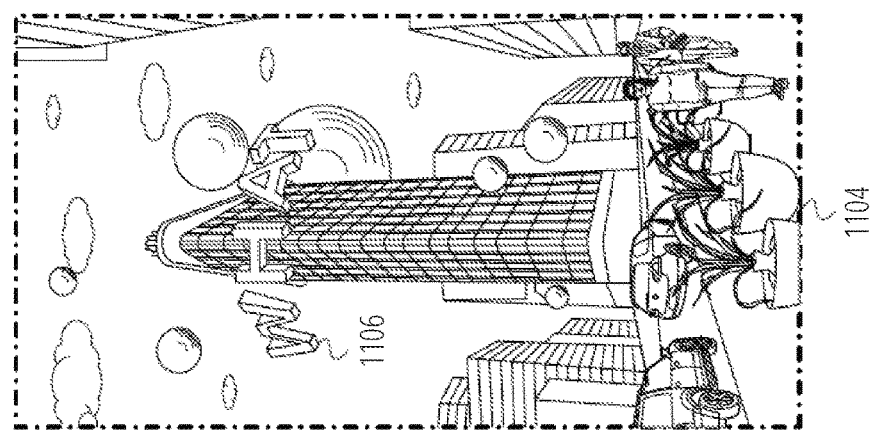
FIG. 11 is an interface flow-diagram illustrating a presentation of location-based AR content according to one example.
Figure 11:
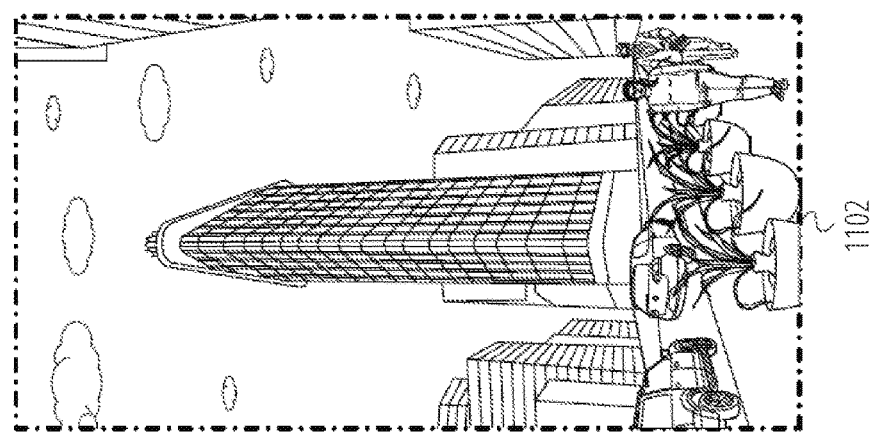

FIG. 11 is an example interface flow-diagram illustrating a presentation of location-based AR content presented by the AR system 106, according to certain example embodiments. As seen in FIG. 11, the interface flow diagram includes an interface diagram 1102 and an interface diagram 1104.

In one example, a client device 102 may cause display of a presentation of the interface diagram 1102. For example, the client device 102 may capture image data via the camera 240 and generate the interface depicted by the interface diagram 1102.

As seen in the interface diagram 1104, the AR system 106 may access media content within a repository (i.e., the database server 120) based on the location of the client device 102. The media content (i.e., the media content 1106), comprising virtual objects or other enhancing information or images, may be associated with the location within a media repository, such that reference to the location within the repository may identify the media content 1106. Alternatively, the media content may be located in memory 204 of the client device 102. The media content may also be identified by user preference or selection.

The AR system 106 may then, based on the 6 DOF pose 426, cause display of a presentation of the media content 1106 at a position within a GUI as seen in the interface diagram 1104, and/or the pose 426 may be used as an initial pose in a tracking system implemented in AR system 106.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium"

and "signal medium" mean the same thing and may be used interchangeably in this disclosure.

What is claimed is:

1. A method, executed by one or more processors, of determining a pose of an augmented reality device, comprising:
   capturing an image of a scene having a number of features;
   extracting descriptors of features of the scene represented in the image;
   matching the descriptors to landmarks in a 3D model of the scene to generate sets of matches between the descriptors and the landmarks;
   generating estimated poses of the augmented reality device from at least some of the sets of matches between the descriptors and the landmarks;
   eliminating estimated poses having deviations from an observed location measurement that are greater than a threshold value;
   determining, for each pose that has not been eliminated, a projected location error corresponding to at least one image distance between a projected 3D landmark and a corresponding feature in the image; and
   selecting the pose having a minimum projected location error as a final pose,
   wherein each projected location error is weighted by a weighting factor that varies depending on an inverse of a distance between the device and a feature in the scene on which a pose is based, prior to selecting the pose having the minimum projected location error as the final pose.

2. The method of claim 1 wherein the deviations are horizontal distances between the estimated poses and the observed location measurement, and the threshold value is a horizontal accuracy of the observed location measurement.

3. The method of claim 1 wherein the deviations are vertical distances between the estimated poses and the observed location measurement, and the threshold value is a vertical accuracy of the observed location measurement.

4. The method of claim 1 wherein the deviations are angular differences between gravity vectors of the estimated poses and an observed gravity vector, and the threshold value is a threshold angular value.

5. An augmented reality system comprising:
   one or more processors;
   location-sensing components;
   an image capture device, and
   one or more machine-readable mediums storing instructions that, when executed by the one or more processors, cause the system to perform operations comprising:
   capturing an image of a scene with the image capture device, the scene having a number of features;
   extracting descriptors of features of the scene represented in the image;
   matching the descriptors to landmarks in a 3D model of the scene to generate sets of matches between the descriptors and the landmarks;
   generating estimated poses of the system from at least some of the sets of matches between the descriptors and the landmarks;
   eliminating estimated poses having deviations from an observed location measurement, determined by the location-sensing components, that are greater than a threshold value;
   determining, for each pose that has not been eliminated, a projected location error corresponding to at least one image distance between a projected 3D landmark and a corresponding feature in the image; and
   selecting the pose having a minimum projected location error as a final pose,
   wherein each projected location error is weighted by a weighting factor that varies depending on an inverse of a distance between the device and a feature in the scene on which a pose is based, prior to selecting the pose having the minimum projected location error as the final pose.

6. The augmented reality system of claim 5 wherein the deviations are horizontal distances between the estimated poses and the observed location measurement, and the threshold value is a horizontal accuracy of the observed location measurement.

7. The augmented reality system of claim 5 wherein the deviations are vertical distances between the estimated poses and the observed location measurement, and the threshold value is a vertical accuracy of the observed location measurement.

8. The augmented reality system of claim 5 wherein the deviations are angular differences between gravity vectors of the estimated poses and an observed gravity vector, and the threshold value is a threshold angular value.

9. A non-transitory machine-readable medium including instructions which, when read by a machine, cause the machine to perform operations for generating a pose for an augmented reality system, comprising:
   capturing an image of a scene having a number of features;
   extracting descriptors of features of the scene represented in the image;
   matching the descriptors to landmarks in a 3D model of the scene to generate sets of matches between the descriptors and the landmarks;
   generating estimated poses of the machine from at least some of the sets of matches between the descriptors and the landmarks;
   eliminating estimated poses having deviations from an observed location measurement that are greater than a threshold value;
   determining, for each pose that has not been eliminated, a projected location error corresponding to at least one image distance between a projected 3D landmark and a corresponding feature in the image; and
   selecting the pose having a minimum projected location error as a final pose,
   wherein each projected location error is weighted by a weighting factor that varies depending on an inverse of a distance between the device and a feature in the scene on which a pose is based, prior to selecting the pose having the minimum projected location error as the final pose.

10. The non-transitory machine-readable medium of claim 9 wherein the deviations are horizontal distances between the estimated poses and the observed location measurement, and the threshold value is a horizontal accuracy of the observed location measurement.

11. The non-transitory machine-readable medium of claim 9 wherein the deviations are vertical distances between the estimated poses and the observed location measurement, and the threshold value is a vertical accuracy of the observed location measurement.

12. The non-transitory machine-readable medium of claim 9 wherein the deviations are angular differences between gravity vectors of the estimated poses and an observed gravity vector, and the threshold value is a threshold angular value.

* * * * *

UNITED STATES PATENT AND TRADEMARK OFFICE
CERTIFICATE OF CORRECTION

PATENT NO. : 11,276,201 B1
APPLICATION NO. : 15/929976
DATED : March 15, 2022
INVENTOR(S) : Garcia Sopo et al.

It is certified that error appears in the above-identified patent and that said Letters Patent is hereby corrected as shown below:

In the Claims

In Column 20, Line 52, in Claim 9, delete "device" and insert --system-- therefor Signed and Sealed this
Twenty-eighth Day of June, 2022

Katherine Kelly Vidal
*Director of the United States Patent and Trademark Office*